(12) United States Patent
Hirao et al.

(10) Patent No.: US 7,502,452 B2
(45) Date of Patent: Mar. 10, 2009

(54) CONTENTS REPRODUCING APPARATUS WITH TELEPHONE FUNCTION

(75) Inventors: Keiji Hirao, Osaka (JP); Toru Kamimura, Shiga (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 418 days.

(21) Appl. No.: 10/534,712

(22) PCT Filed: Nov. 12, 2003

(86) PCT No.: PCT/JP03/14407

§ 371 (c)(1),
(2), (4) Date: May 12, 2005

(87) PCT Pub. No.: WO2004/045193

PCT Pub. Date: May 27, 2004

(65) Prior Publication Data

US 2006/0035626 A1 Feb. 16, 2006

(30) Foreign Application Priority Data

Nov. 13, 2002 (JP) ............................. 2002-329843

(51) Int. Cl.
*H04M 11/00* (2006.01)

(52) U.S. Cl. ...................... 379/101.01; 379/110.01; 379/90.01; 370/352

(58) Field of Classification Search ............ 379/101.01, 379/90.01, 110.01; 370/352
See application file for complete search history.

(56) References Cited

U.S. PATENT DOCUMENTS 6,522,894 B1 * 2/2003 Schmidt ................. 455/552.1
2002/0001303 A1 * 1/2002 Boys ......................... 370/352

FOREIGN PATENT DOCUMENTS

| JP | 3-3867 | 1/1991 |
| JP | 3867/1991 | 1/1991 |
| JP | 7-11041 | 2/1995 |
| JP | 11041/1995 | 2/1995 |
| JP | 2001-230884 | 8/2001 |

OTHER PUBLICATIONS

Japanese Office Action dated Jul. 8, 2008.

* cited by examiner

*Primary Examiner*—Stella L Woo
(74) *Attorney, Agent, or Firm*—Kratz, Quintos & Hanson, LLP

(57) ABSTRACT

A contents reproducing apparatus includes a main CPU, and the main CPU causes a DSP to decode broadcast data included in a radio packet signal input via a LAN controller in a radio mode, and inputs decoded PCM data to a D/A converter. As a result, a sound of Internet radio is output from a speaker. On the other hand, in a telephone mode, the main CPU causes the DSP to decode receiving speech data included in a telephone packet signal input via the LAN controller, and inputs decoded PCM data to a PCM codec. The CPU causes the DSP to encode the sending speech data input from the PCM codec, and packetizes encoded data to input it to the LAN controller. Thus, it is possible to make a communication with an opponent party.

9 Claims, 7 Drawing Sheets

CONTENTS REPRODUCING APPARATUS WITH TELEPHONE FUNCTION

TECHNICAL FIELD

The present invention relates to a contents reproducing apparatus with telephone function. More specifically, the present invention relates to a contents reproducing apparatus with telephone function capable of selectively reproducing a telephone voice signal and a first content signal.

PRIOR ART

A number of techniques for integrating an apparatus for reproducing contents such as music, etc. and a telephone are conventionally proposed. For example, in Japanese Patent Laying-open No. 4-134952, a mobile telephone apparatus integrating a cassette tape recorder and/or a radio receiver is disclosed. By integrating the cassette tape recorder and/or radio receiver into the mobile telephone apparatus, it is possible to utilize the mobile telephone apparatus as a cassette tape recorder or a radio receiver during a stand-by time period.

By the way, along with the popularization of the Internet and broadbandization of communication lines, a so-called Internet radio broadcasting capable of delivering on the Internet programs similarly to radio broadcasting has recently come into practical use. Furthermore, in a telephone communication sector also, the Internet (IP: Internet Protocol) telephone service for making a communication by use of the Internet has been put to practical use. Similarly to the above-described prior art, it is convenient that both of the Internet radio receiver for receiving such the Internet radio broadcasting and the IP telephone for receiving the Internet telephone service are provided in an integrated manner. Also, since information is transmitted on the basis of the TCP/IP (Transmission Control Protocol/Internet Protocol) in both cases, it is possible to utilize a circuit portion for performing a decoding process in common, capable of realizing cost reduction of the apparatus.

However, when a part of the apparatus is utilized in common, the apparatus cannot simultaneously execute the functions as an Internet radio receiver and the function as an IP telephone. Accordingly, at a time that a program of the Internet radio broadcasting is received, when there is a telephone call to activate the function as the IP telephone function, the program that has been received is suddenly interrupted. In this case, when only one listener for listening to the Internet radio broadcasting is present, and he/she answers a telephone call, there is not cause for concern, but when two or more listeners are present, and any one of them answers a telephone call, the other listeners feel unpleasantness in a sudden silent circumstance (the one calls by voices).

SUMMARY OF THE INVENTION

Therefore, it is a primary object of the present invention to provide a novel contents reproducing apparatus with telephone function.

Another object of the present invention is to provide a contents reproducing apparatus with telephone function capable of melting unpleasantness due to activation of a telephone function while reproducing contents.

A contents reproducing apparatus with telephone function according to the present invention comprises a reproducing means for selectively reproducing a telephone voice signal and a first content signal, a generating means for generating a second content signal, a disabling means for disabling the generating means when a reproduced signal by the reproducing means is the first content signal, and an activating means for activating the generating means when a reproduced signal by the reproducing means is the telephone voice signal.

According to this invention, the reproducing means selectively reproduces the telephone voice signal or the first content signal. When the first content signal is reproduced by the reproducing means, the generating means is disabled by the disabling means. On the other hand, when the telephone voice signal is reproduced by the reproducing means, that is, when the function as a telephone works, the generating means is activated by the activating means. Consequently, the second content signal is generated by the generating means.

In one embodiment of the present invention, the telephone voice signal is output by the first output means. Then, the first content signal and the second content signal are output from the second output means.

In another embodiment of the present invention, the telephone voice signal and the first content signal are received by the receiving means via a common communication line.

It is noted that the second content signal is preferably the same genre as the first content signal.

Furthermore, the present invention is effective when being applied to a fixed-type apparatus. That is, in the fixed-type apparatus use, a plurality of persons simultaneously receive contents in some cases. In such a case, if one speaks by utilizing the telephone function, the others can receive contents according to the second content signal.

According to the present invention, when the function as a telephone is activated during reproduction of the first content signal, the second content signal is generated, capable of melting unpleasantness of a person receiving the contents.

The above described objects and other objects, features, aspects and advantages of the present invention will become more apparent from the following detailed description of the present invention when taken in conjunction with the accompanying drawings.

BEST MODE FOR PRACTICING THE INVENTION

Figure 1:
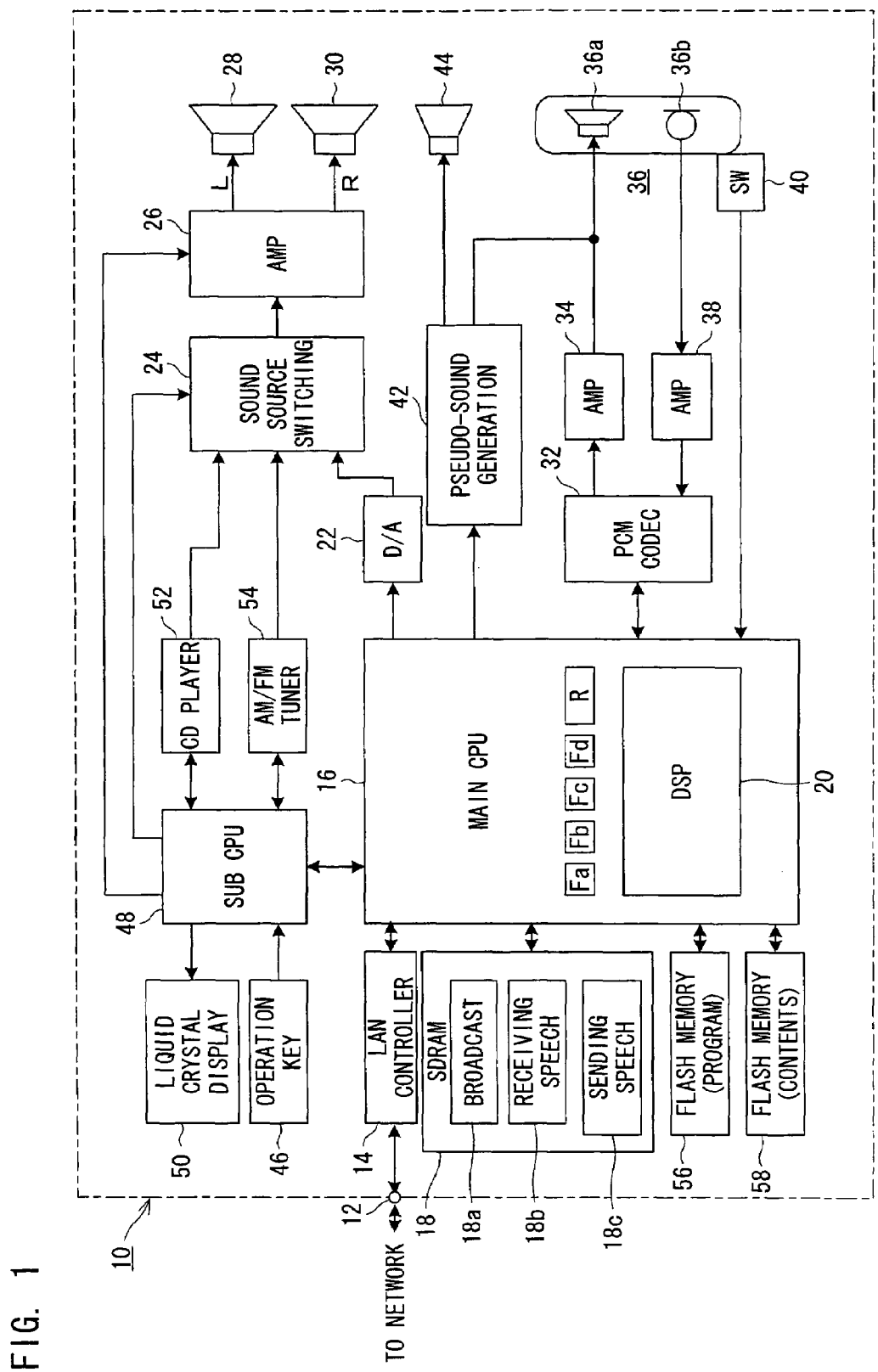
FIG. 1 is a block diagram showing a configuration of one embodiment of the present invention.

Referring to FIG. 1, a contents reproducing apparatus with telephone function (hereinafter, simply referred to as a contents reproducing apparatus) 10 is a fixed-type apparatus including a function as an Internet radio receiver and a function as an IP telephone, and provided with a communication connector 12 to be connected to a telephone line (strictly, ADSL (Asymmetric Digital Subscriber Line) modem not shown) via a communication cable not shown. The communication connector 12 is connected to a main CPU (Central Processing Unit) 16 via a LAN (Local Area Network) controller 14 within the contents reproducing apparatus 10. It is noted that the main CPU 16 is formed of an ASIC (Application Specified IC).

When the contents reproducing apparatus 10 functions as the Internet radio receiver, the main CPU 16 becomes a radio mode. In the radio mode, the main CPU 16 fetches streaming data including broadcasting contents from radio packet signals being sequentially input via the LAN controller 14. Then, the fetched streaming data, that is, the broadcast data are sequentially stored in a broadcast data storing area 18a of an SDRAM (Synchronous Dynamic RAM) 18. When a data amount of the broadcast data stored in the broadcast data storing area 18a reaches a first threshold value, the main CPU 16 transfers the stored broadcast data to a DSP (Digital Signal Processor) 20 incorporated in itself. It is noted that the first threshold value here is of the order of 16 [kB]-32 [kB], for example, and corresponds to the data amount of the order of one seconds-two seconds in terms of time.

The broadcast data transferred to the DSP 20 is data compressed based on a well-known sound information compression system such as MP3 (MPEG-1/Audio Layer3) and WMA (Windows Media Audio: registered trademark), and the DSP 20 decodes the compressed broadcast data to reproduce PCM (Pulse Code Modulation) data before the compression. The reproduced PCM data is input to a D/A converter 22, and converted into a sound signal being an analog electric signal. The converted sound signal is input to an amplifier circuit 26 via a sound source switching circuit 24 so as to be subjected to an amplifying process and then, input to respective speakers 28 and 30 on both sides. Thus, a sound of Internet radio broadcast is output from the respective speakers 28 and 30.

On the other hand, when the contents reproducing apparatus 10 functions as an IP telephone, the main CPU 16 becomes a telephone mode. In the telephone mode, the main CPU 16 fetches streaming data including contents of a receiving speech from telephone packet signals being sequentially input via the LAN controller 14. Then, the fetched streaming data, that is, receiving speech data are sequentially stored into a receiving speech data storing area 18b of the SDRAM 18. When a data amount of the receiving speech data stored in the receiving speech data storing area 18b reaches a second threshold value, the main CPU 16 transfers the stored receiving speech data to the DSP 20. It is noted that the second threshold value here is also a value approximately the same as the first threshold value (the order of 16 [kB]-32 [kB]), and corresponds to the data amount of the order of one seconds-two seconds in terms of time.

The receiving speech data transferred to the DSP 20 is compressed in a sound information compression format for communication such as the ADPCM (ITU-T Recommendation G.726) and the CS-CELP (ITU-T Recommendation G.729), and the DSP 20 decodes the compressed receiving speech data into PCM data according to a well-known μ-law (ITU-T Recommendation G.711) compression/expansion rules. The converted PCM data is input to a PCM codec 32, and subjected to a decoding process according to the μ-law compression/expansion rules so as to be converted into a sound signal being an analog electric signal, that is, a receiving speech signal. The converted receiving speech signal is input to a speaker 36a of a receiver 36 after being amplified by an amplifier circuit 34. Thus, a receiving speech sound is output from the speaker 36a.

Furthermore, in the telephone mode, a sound input to a microphone 36b of the receiver 36, that is, a sending speech voice is converted into a sending speech signal being an analog electric signal by the microphone 36b. The converted sending speech signal is amplified by an amplifier circuit 38, and then, input to the PCM codec 32. The PCM codec 32 performs an encoding process according to the above-described μ-law compression/expansion rules on the input sending speech signal to generate PCM data, that is, sending speech data. The generated sending speech data are sequentially stored in a sending speech data storing area 18c of the SDRAM 18 in the DMA (Direct Memory Access) system. Specifically, at the same time that the above-described receiving speech data is decoded by the DSP 20, the sending speech data is sequentially stored in the sending speech data storing area 18c of the SDRAM 18. When the data amount of the sending speech data stored in the sending speech data storing area 18c reaches a third threshold value, and the receiving speech data is not subjected to a decoding process by the DSP 20, that is, the data amount of the receiving speech data in the receiving speech data storing area does not reach the second threshold value, the main CPU 16 transfers the sending speech data stored in the sending speech data storing area 18c to the DSP 20.

It is noted that the third threshold value is larger than the second threshold value, and is, for example, 64 [KB]-128 [KB]. However, the sending speech data stored in the sending speech data storing area 18c is data complying with the μ-law compression/expansion rules lower in compression ratio than the receiving speech data of the receiving speech data storing area 18b, and therefore, the third threshold value corresponds to the data amount of the order of one seconds-two seconds in terms of time similarly to the second threshold value.

The DSP 20 performs the encoding process complying with the above-described ADPCM format or CS-CELP format on the transferred sending speech data. Then, the main CPU 16 forms the encoded data into a packet signal complying with the TCP/IP, and inputs the formed packet signal to the LAN controller 14. The LAN controller 14 sends the input packet signal in an access system according to the Ethernet (registered trademark) standard via the communication connector 12. Thus, the packet signal including the sending speech data is transmitted to an opponent party for making a speech.

Figure 2:
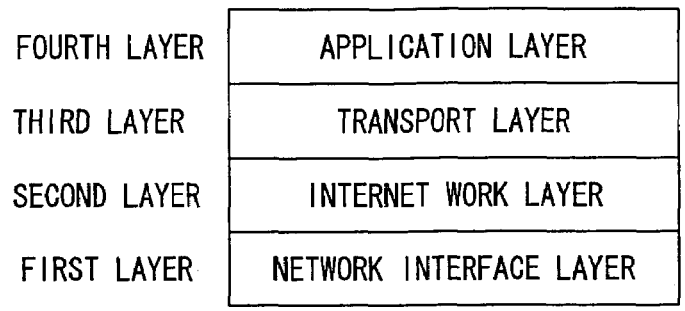
FIG. 2 is an illustrative view showing a configuration of a packet transmitted or received in FIG. 1 embodiment.

It is noted that the radio packet signal input to the main CPU 16 via the LAN controller 14 in the radio mode and the telephone packet signal input to the main CPU 16 via the LAN controller 14 in the telephone mode also comply with the above-described TCP/IP. The packet signal complying with the TCP/IP has four layers including the first to fourth layers as shown in FIG. 2.

The first layer being the lowest layer is called a "network interface layer". In the "network interface layer", information relating to an apparatus actually connected to the network (Interne, here) such as the MAC (Media Access Control) address, an interface standard (Ethernet standard, here) adapted to the apparatus, etc. is stored. The second layer is called an "Internet work layer", and in the "Internet work layer", information required for sending a packet signal to the opponent party such as information relating to addressing and routing, etc. is stored. The third layer is called a "transport layer", and in the "transport layer", information for retaining reliability of communication between a sender and a receiver such as an order of the packet signal, error correction, retransmission control in a case of occurrence of an error, etc. is stored. Then, the fourth layer being the highest layer is called an "application layer", and in the "application layer", data to be transmitted and received such as the broadcast data in the radio mode and the receiving speech data or the sending speech data in the telephone mode, etc. is stored. Furthermore, in the "application layer", various instructions such as a channel selecting instruction, a calling instruction, etc. described later are also stored.

Meanwhile, when receiving a telephone call in the radio mode, that is, when receiving a telephone packet signal including a calling instruction indicating that there is a telephone call from an arbitrary opponent party via the LAN controller 14, the main CPU 16 shifts from the radio mode to the telephone mode. Then, an incoming instruction for informing the opponent party of arriving a calling instruction is generated, and a packet signal including the incoming instruction in the above-described "application layer" is further generated. The generated packet signal is input to the LAN controller 14. Thus, the telephone packet signal including the incoming instruction is transmitted to the opponent party, and on the opponent party, it is recognized that the calling instruction is arrived at a calling destination called by the opponent party.

The main CPU 16 further controls a pseudo-sound generating circuit 42 to output an incoming tone from the speaker 44. This incoming tone continues to be output until the receiver 36 is held to change a hook switch 40 into an off-hook state, that is, until an operator answers the telephone. Then, when the hook switch 40 becomes the off-hook state, the main CPU 16 generates a response instruction indicative of responding to the calling from the opponent party, and further generates a packet signal including the response instruction in the "application layer". Then, the generated packet signal is input to the LAN controller 14. Thus, the telephone packet signal including the response instruction is transmitted to the opponent party to establish a communication with the opponent party.

It is noted that when the opponent party hangs off before the operator takes the telephone, that is, when the telephone packet signal including an end speech instruction indicative of being rung off by the opponent party during the output of the incoming tone is received via the LAN controller 14, the CPU 16 generates a similar end speech instruction. Then, a packet signal including this end speech instruction in the "application layer" is generated, and the generated packet signal is input to the LAN controller 14. Thus, the telephone packet signal including the end speech instruction is transmitted to the opponent party, and a communication performance with the opponent party is ended (before an actual communication is performed). Furthermore, the main CPU 16 controls the pseudo-sound generating circuit 42 to stop outputting the incoming tone from the speaker 44. Thereafter, the telephone mode is shifted to the radio mode.

Also, when the receiver 36 is lifted to change the hook switch 40 to the off-hook state in the radio mode, the main CPU 16 shifts from the radio mode to the telephone mode. Then, the pseudo-sound generating circuit 42 is controlled to output a dial tone from the speaker 36a of the receiver 36. The dial tone is continued to be output until a dialing operation described later is made by the operation key 46. It is noted that when the hook switch 40 is shifted to the on-hook state before the dialing operation is made, the main CPU 16 controls the pseudo-sound generating circuit 42 to stop the output of the dial tone from the speaker 36a. Then, the telephone mode is shifted to the radio mode.

When the dialing operation is made as described above, the main CPU 16 generates a calling instruction for calling the opponent party designated by the dialing operation. A packet signal including the calling instruction in the "application layer" is generated, and the generated packet signal is input to the LAN controller 14. Thus, the telephone packet signal including the calling instruction is transmitted to the opponent party.

When in response to the transmission of the telephone packet signal including this calling instruction, a telephone packet signal including the incoming instruction similarly to the above-description is transmitted from the opponent party, the main CPU 16 controls the pseudo-sound generating circuit 42 to output a calling sound from the speaker 36a of the receiver 36. The calling sound continues to be output until a telephone packet signal including a response instruction similarly to the above description is transmitted from the opponent party. Then, when the telephone packet signal including the response instruction is received, the main CPU 16 controls the pseudo-sound generating circuit 42 to stop outputting the calling sound from the speaker 36a. This enables establishment of a communication with the opponent party.

It is noted that in a case that the line is busy on the opponent party side at a time that the telephone packet signal including the calling instruction is transmitted, a telephone packet signal including a busy instruction is transmitted from the opponent party. In this case, the main CPU 16 controls the pseudo-sound generating circuit 42 to output a busy tone from the speaker 36a of the receiver 36. The busy tone continues to be output until the hook switch 40 is shifted to the on-hook state.

Furthermore, in a case that a telephone number designated by the dialing operation is a missing number, a telephone packet signal including the missing number is sent from an arbitrary server in the Internet (en route). In this case, the main CPU 16 controls the pseudo-sound generating circuit 42 to output a sound message indicating that designated telephone number is a missing number (error) from the speaker 36a of the receiver 36. The sound message also continues to be output until the hook switch 40 shifted to the on-hook state.

When the opponent party hangs up in a state a communication is established with the opponent party, a telephone packet signal including an end speech instruction similarly to the above description is transmitted from the opponent party. When receiving the telephone packet signal, the main CPU 16 controls the pseudo-sound generating circuit 42 to output a busy tone from the speaker 36a of the receiver 36. The busy tone continues to be output until the hook switch 40 shifts to the on-hook state. Then, when the hook switch 40 is shifted to the on-hook state, the main CPU 16 generates a similar telephone packet signal including the end speech instruction, and inputs the generated telephone packet signal to the LAN controller 14. Thus, the telephone packet signal including the end speech instruction is transmitted to the opponent party to end a series of communication performance with the opponent party. Then, the main CPU 16 shifts from the telephone mode to the radio mode.

On the other hand, when the hook switch 40 is shifted to the on-hook state before the opponent party hangs up in a state communication is established, the main CPU 16 generates a telephone packet signal including the end speech instruction as described above, and inputs the generated telephone packet signal to the LAN controller 14. Thus, the telephone packet signal including the end speech instruction is transmitted to the opponent party. In response to the transmission of the telephone packet signal, when receiving a similar telephone packet signal including the end speech instruction from the opponent party, the main CPU 16 ends a series of communication performances. Then, the telephone mode is shifted to the radio mode.

Furthermore, the contents reproducing apparatus 10 in this embodiment includes a sub CPU 48 in addition to the main CPU 16. The sub CPU 48 is in charge of a so-called man-machine interface, and the above-described operation key 46 is connected to the sub CPU 48.

Specifically, when a dialing operation is performed in the telephone mode as described above, the sub CPU 48 informs the main CPU 16 of the content of the dialing operation. The main CPU 16 generates the above-described calling instruction on the basis of the content of the dialing operation informed by the sub CPU 48.

Alternatively, when the main CPU 16 is in the radio mode, it can arbitrarily select a receiving channel (station) by an operation of the operation key 46. More specifically, when an arbitrary channel is selected by an operation of the operation key 46, the sub CPU 48 informs the main CPU 16 of information relates to the selected channel. The main CPU 16 generates a channel selecting instruction for receiving broadcast of the selected channel on the basis of the information informed by the sub CPU 48. Then, a packet signal including the channel selecting instruction is generated, and the generated packet signal is input to the LAN controller 14. Thus, the radio packet signal including the channel selecting instruction is transmitted to a broadcast station (server) designated by the channel selecting instruction, and a radio packet signal including broadcast data is transmitted from the broadcast station to the contents reproducing apparatus 10.

The sub CPU 48 is also connected with a liquid crystal display 50. When the main CPU 16 is in the radio mode, the sub CPU 48 displays on the liquid crystal display 50 information indicative of a current receiving circumstance such as a name of the selecting receiving channel, a compression format of the broadcast data on reception, etc. On the other hand, when the main CPU 16 is in the telephone mode, the sub CPU 48 displays a current communication circumstance indicative of a telephone number of the opponent party, a calling time period, etc. on the liquid crystal display 50.

Furthermore, the contents reproducing apparatus 10 in this embodiment is provided with a CD (Compact Disc) player 52 and an AM/FM tuner 54. Then, when the main CPU 16 shifts from the radio mode to the telephone mode, a sound (including music) taking any one of the CD player 52 and the AM/FM tuner 54 as a sound source can be output as a BGM from the speakers 28 and 30.

Specifically, when the main CPU 16 shifts from the radio mode to the telephone mode, information thereof is transmitted to the sub CPU 48 from the main CPU 16. The sub CPU 48 receives the information from the main CPU 16 to operate (turn on) any one of the CD player 52 and the AM/FM tuner 54 according to a BGM setting condition described later. Then, the sound source switching circuit 24 is controlled such that an analog sound signal output from any one of the CD player 52 and the AM/FM tuner 54 is input to the amplifier circuit 26 via the sound source switching circuit 24. Furthermore, the sub CPU 48 sets a gain of the amplifier circuit 26 according to the above-described BGM setting condition. Thus, a BGM taking any one of the CD player 50 and the AM/FM tuner 52 as a sound source is output from the speakers 28 and 30.

It is noted that it is possible to previously set which is to be operated as a BGM sound source, the CD player 50 and the AM/FM tuner 52 by operating the operation key 46. It is also possible to arbitrarily set a gain of the amplifier circuit 26 at that time, that is, a volume of the BGM by operating the operation key 46. Also, it is possible to set so as not to output the BGM. These settings are stored in the flash memory 56 as the above-described BGM setting condition. Then, the BGM setting condition is, when the main CPU 16 shifts from the radio mode to the telephone mode, read by the main CPU 16 so as to be transmitted to the sub CPU 48.

In the flash memory 56, a control program for controlling an operation of the main CPU 16 is also stored. Also stored in the flash memory 56 by the above described pseudo-sound generating circuit 42 is pseudo sound data for outputting an incoming tone, a dial tone, a calling sound, a busy tone and a sound message.

Furthermore, the contents reproducing apparatus 10 in this embodiment is provided with another flash memory 58 in addition to the above. The flash memory 58 is utilized as contents memory for downloading the broadcast data while the above-described flash memory 56 is a program memory storing a control program and so on. More specifically, in the radio mode, when a recording instruction is applied by an operation of the operation key 46, the main CPU 16 records the received broadcast data before decoded in the flash memory 58. Although the recorded broadcast data can be reproduced in the reproduction mode, a detailed description will be omitted here.

Furthermore, as to the above-described CD player 52 and AM/FM tuner 54, respective reproduction sounds can be output from the arbitrary speakers 28 and 30. The detailed description thereof will also be omitted here.

Meanwhile, when a setting of receiving the Internet radio broadcasting is made, the main CPU 16 executes a flowchart in FIG. 3-FIG. 7 according to the above-described control program. It is noted that directly after the power supply of the contents reproducing apparatus 10 in this embodiment is turned on, "0" is set to each of flags Fa, Fb, Fc, and Fd described later.

Figure 3:
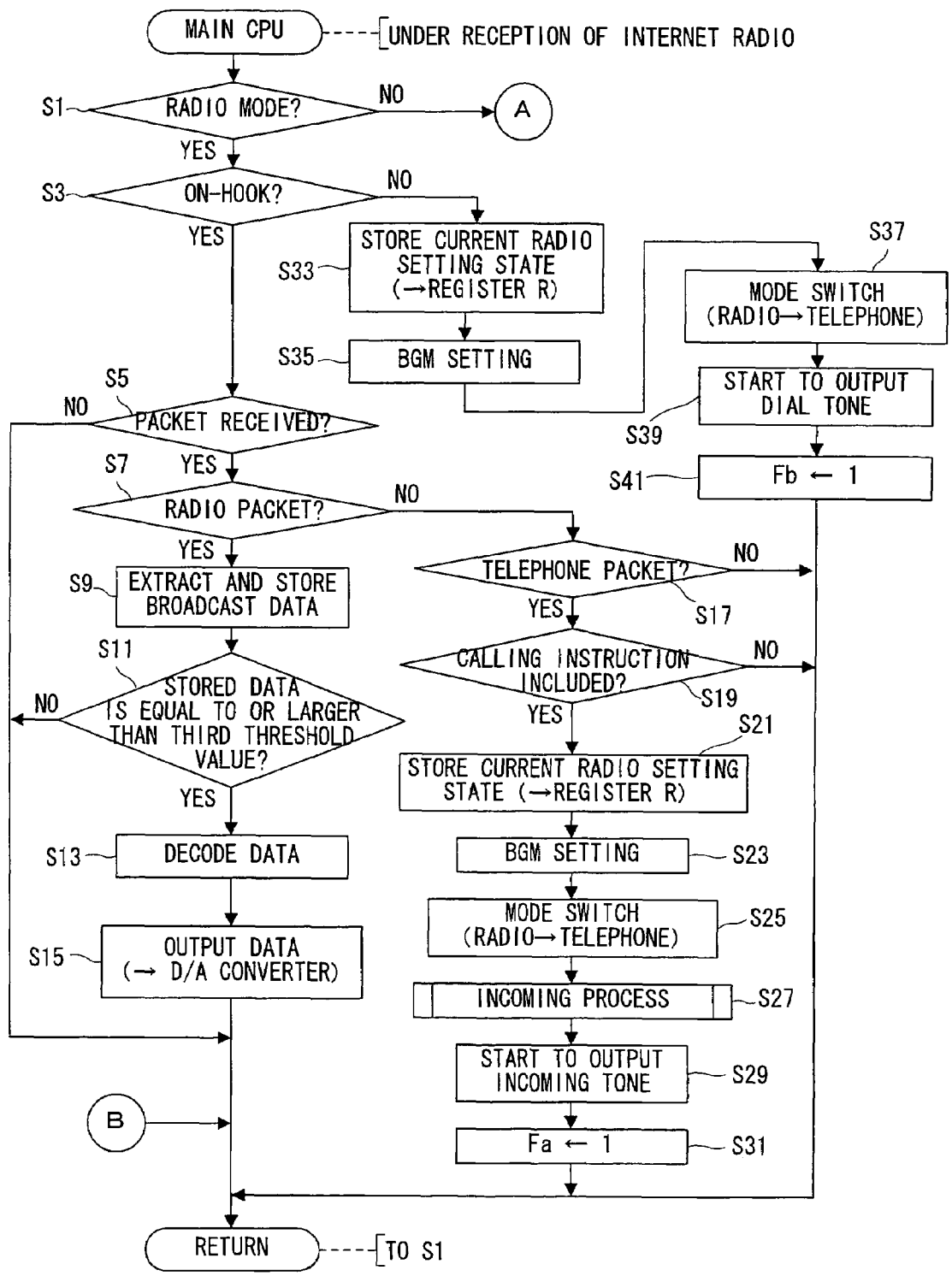
FIG. 3 is a flowchart showing a part of an operation of a main CPU in FIG. 1.

That is, the main CPU 16 determines whether or not a current mode is a radio mode in a step S1 in FIG. 3. If it is determined to be the radio mode here, the process proceeds to a step S3 to determine whether or not the hook switch 40 is in the on-hook state.

When the hook switch 40 is in the on-hook state, the main CPU 16 proceeds from the step S3 to a step S5 to determine whether or not any packet signal is received via the LAN controller 14. In a case that a packet signal is not received, the processes go through at a time to repeat from the step S1 again. On the other hand, when any packet signal is received, the process proceeds from the step S5 to a step S7. Then, it is determined whether or not the received packet signal is the radio packet signal.

When it is determined the radio packet signal is received in the step S7, the main CPU 16 proceeds to a step S9 to extract broadcast data from the received radio packet signal, and store the extracted broadcast data in the broadcast data storing area 18*a* of the SDRAM 18. Then, it is determined whether or not a data amount of the broadcast data stored in the broadcast data storing area 18*a* reaches a first threshold value in a step S11.

In a case that the broadcast data in the broadcast data storing area 18*a* does not reach the first threshold value, the process by the main CPU 16 goes through this flowchart at a time to repeat from the step S1 again. One the other hand, in a case that the broadcast data in the broadcast data storing area 18*a* reaches the first threshold value, the process proceeds to a step S13 to transfer the broadcast data in the broadcast data storing area 18*a* to the DSP 20 so as to be decoded. Then, PCM data reproduced by this decoding is output to the D/A converter 22 in a step S15. Consequently, a sound of the Internet radio is output from the speakers 28 and 30.

When it is determined that the received packet signal is not the radio packet signal in the above-described step S7, the main CPU 16 proceeds to a step S17. In the step S17, it is determined whether or not the received packet signal is the telephone packet signal, and in a case of the telephone packet signal, it is determined whether or not the telephone packet signal includes the above-described calling instruction in a step S19. In a case that the calling instruction is included, the process proceeds to a step S21. It is noted that when it is determined that the received packet signal is not the telephone packet signal in the step S17, or when it is determined that the calling instruction is not included in the step S19, the process goes through this flowchart at a time to repeat from the step S1 again.

In the step S21, the main CPU 16 stores in a register R incorporated in itself a current setting state as an Internet radio receiver, that is, a current receiving channel and a volume (gain of the amplifier circuit 26). Then, in a step S23, the sub CPU 48 is controlled so as to play a BGM on the basis of the BGM setting condition stored in the above-described flash memory 56, or to prohibit the output of the BGM. After the radio mode is shifted to the telephone mode in a step S25, an incoming process is executed in a step S27. That is, the above-described incoming instruction is generated, and a telephone packet signal including the incoming instruction is further generated. Then, the generated telephone packet signal is input to the LAN controller 14.

After executing the incoming process in the step S27, the main CPU 16 controls the pseudo-sound generating circuit 42 so as to generate an incoming tone from the speaker 44 in a step S29. Then, in a step S31, "1" is set to the flag Fa provided in itself, and the process goes through the flowchart. It is noted that the flag Fa is an index for indicating whether or not a calling instruction from the opponent party is in an arrival state, and when the flag Fa is "1", this indicates an arrival state of the calling instruction from the opponent party. On the other hand, when the flag Fa is "0", the calling instruction from the opponent party is not arrived.

Furthermore, in the above-described step S3, when the hook switch 40 is not in the on-hook state, that is, in the off-hook state, the main CPU 16 proceeds to a step S33. Then, a current setting state as the Internet radio is stored in the register R in the step S33, and the sub CPU 48 is controlled so as to play a BGM on the basis of the BGM setting condition stored in the above-described flash memory 56 in a step S35, or to prohibit the output of the BGM in a step S37. Furthermore, in the step S37, the radio mode is shifted to the telephone mode, and in a step S39, the pseudo-sound generating circuit 42 is controlled so as to generate the above-described dial tone from the speaker 36a of the receiver 36. Then, in a step S41, "1" is set to the flag Fb provided in itself, and the process goes through the flowchart. It is noted that the flag Fb is an index indicating whether or not the operator intends to make a telephone call from now, and when the flag Fb is "1", this means that the operator lifts the receiver 36 to make a telephone call. On the other hand, when the flag Fb is "0", this means that the operator does not intend to make a telephone call, and does not lift the receiver 36.

Figure 4:
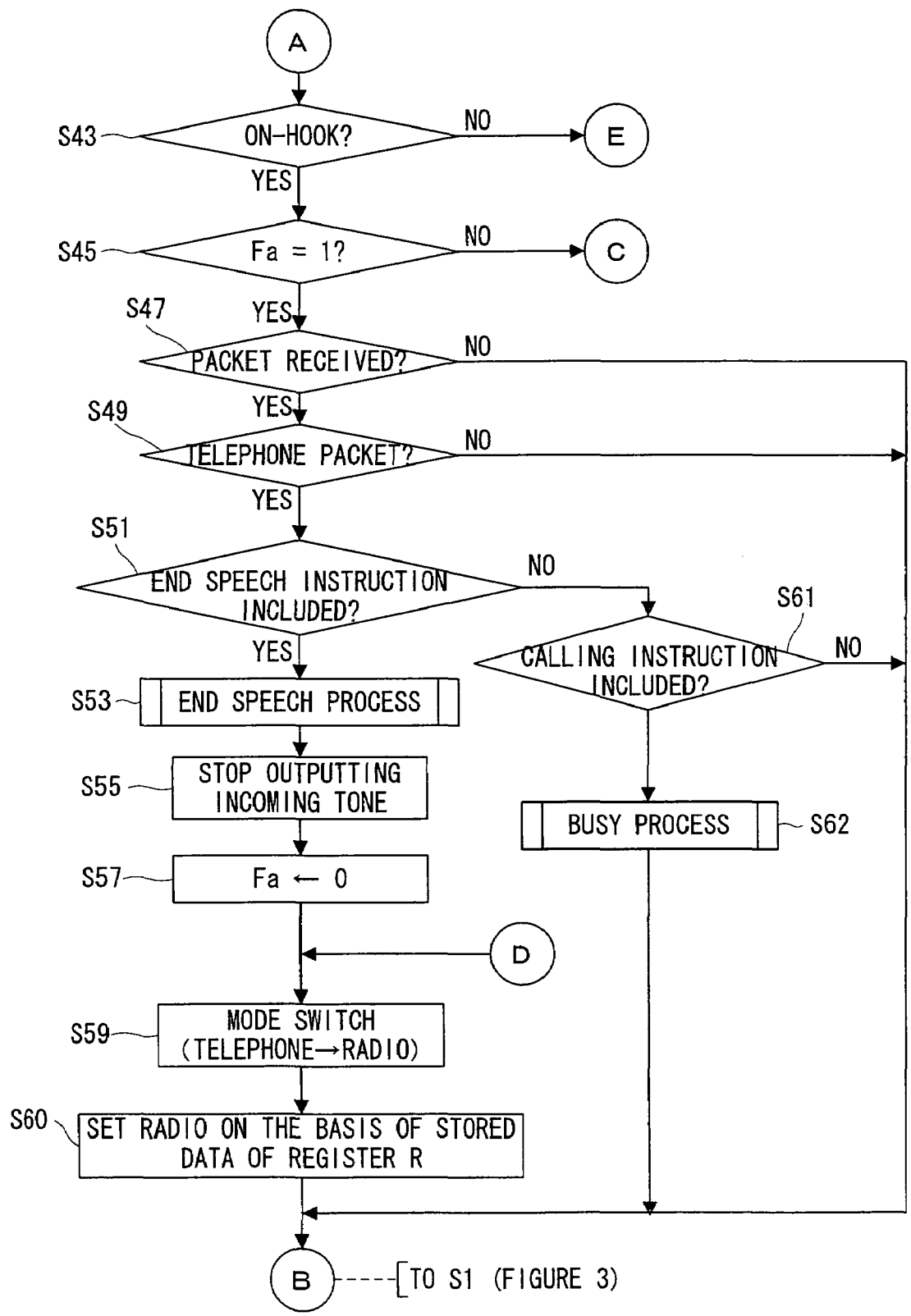
FIG. 4 is a flowchart continued from FIG. 3.

In the telephone mode in the above-described step S1, the main CPU 16 proceeds to a step S43 shown in FIG. 4. Then, it is determined whether or not the receiver 36 is in the on-hook state in the step S43.

When the receiver 36 is in the on-hook state, the main CPU 16 determines whether or not the above-described flag Fa is "1" in a step S45. Then, when the flag Fa is "1", that is, when a calling instruction from the opponent party is received, it is determined whether or not any packet signal is received in a step S47. In a case that no packet signal is arrived, the process goes through this flowchart at a time to repeat from the step S1 again. On the other hand, when any packet signal is received, the process proceeds to a step S49 to determine whether or not the received packet signal is the telephone packet signal.

When it is determined the telephone packet signal is received in the step S49, the main CPU 16 further determines whether or not the above-described end speech instruction is included in the telephone packet signal in a step S51. Then, in a case that the end speech instruction is included, an end speech process is executed in a step S53. That is, the above-described telephone packet signal including the end speech instruction is generated, and the generated telephone packet signal is input to the LAN controller 14.

After executing the end speech process in the step S53, the main CPU 16 controls the pseudo-sound generating circuit 42 so as to stop outputting the above-described incoming tone in a step S55. Then, "0" is set to the flag Fa in a step S57, and then, the telephone mode is switched to the radio mode in a step S59. Furthermore, a receiving channel of the Internet radio and its volume also are set on the basis of the data stored in the above-described register R in a step S61. Then, the process goes through the flowchart to return to the step S1.

It is noted that in a case that it is determined that the received packet signal is not the telephone packet signal in the above-described step S49, the process of the main CPU 16 goes through the flowchart to return to the step S1. Furthermore, in a case that it is determined that the end speech instruction is not included in the telephone packet signal in the step S51, the process proceeds to a step S61 to determine whether or not the calling instruction is included. When the calling instruction is included here, the busy process is executed in a step S62. That is, a telephone packet signal including the above-described busy instruction is generated, and the generated telephone packet signal is input to the LAN controller 14. On the other hand, in a case that the calling instruction is not included, the process goes through the flowchart to return to the step S1.

Figure 5:
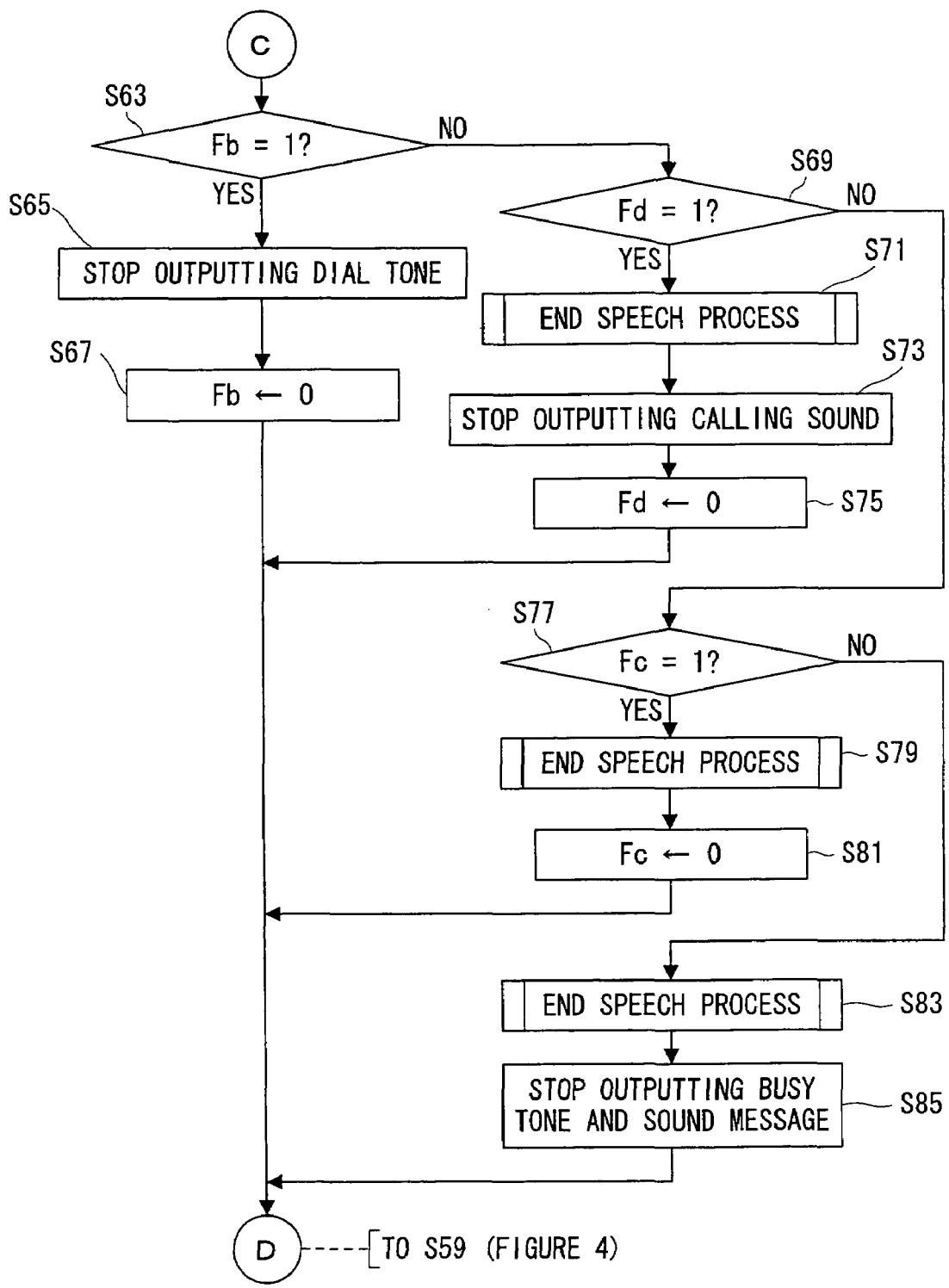
FIG. 5 is a flowchart continued from FIG. 4.

In addition, in a case that "1" is not set to the flag Fa in the above-described step S45, the main CPU 16 proceeds to a step S63 shown in FIG. 5. In the step S63, it is determined whether or not "1" is set to the flag Fb. If "1" is set to the flag Fb, that is, if the receiver 36 is lifted up, the process proceeds to a step S65. In the step S65, the pseudo-sound generating circuit 42 is controlled so as to stop outputting the above-described dial tone, "0" is set to the flag Fb in a step S67, and then, the process proceeds to the step S59 in FIG. 4.

On the other hand, in a case that the flag Fb is "0" in the step S63, the main CPU 16 proceeds to a step S69. Then, it is determined whether or not "1" is set to the flag Fd in the step S69. It is noted that the flag Fd is an index for indicating that the opponent party is being called, and when the flag Fd is "1", this means that the opponent party is under being called. On the other hand, when the flag Fd is "0", this means that the opponent party is not under being called.

In the step S69, when the flag Fd is "1", that is, when the opponent party is under being called, the main CPU 16 executes an end speech process similarly to the above-described step S53 in a step S71. In this case, since the above-described calling sound is output from the speaker 36a of the receiver 36, the pseudo-sound generating circuit 42 is controlled so as to stop outputting the calling sound in a step S73. Then, "0" is set to the flag Fd in a step S75, and the process proceeds to the step S59 in FIG. 4.

In a case that the flag Fd is "0" in the step S69, the main CPU 16 proceeds to a step S77. Then, it is determined whether or not "1" is set to the flag Fc. The flag Fc is an index indicating whether or not the opponent party is being communicated, and the flag Fc indicates it is under-communication with the opponent-party when it is "1". On the other hand, when the flag Fc is "0", this means it is not under-communication with the opponent party.

In a case that the flag Fc is "1" in the step S77, that is, in a case that it is under communication with the opponent party, the main CPU 16 executes the end speech process in a step S79 as the same as that in the steps S53 and the S71. Then, in a step S81, "0" is set to the flag Fc, and the process proceeds to the step S59 in FIG. 4.

On the other hand, when the flag Fc is "0" in the step S77, the main CPU 16 proceeds to a step S83 to execute the end speech process similarly to that in the step S79. In this case, since the above-described busy tone or sound message is output from the speaker 36*a* of the receiver 36, the pseudo-sound generating circuit 42 is controlled so as to stop outputting the busy tone or the sound message in a step S85, and the process proceeds to the step S59 shown in FIG. 4.

Figure 6:
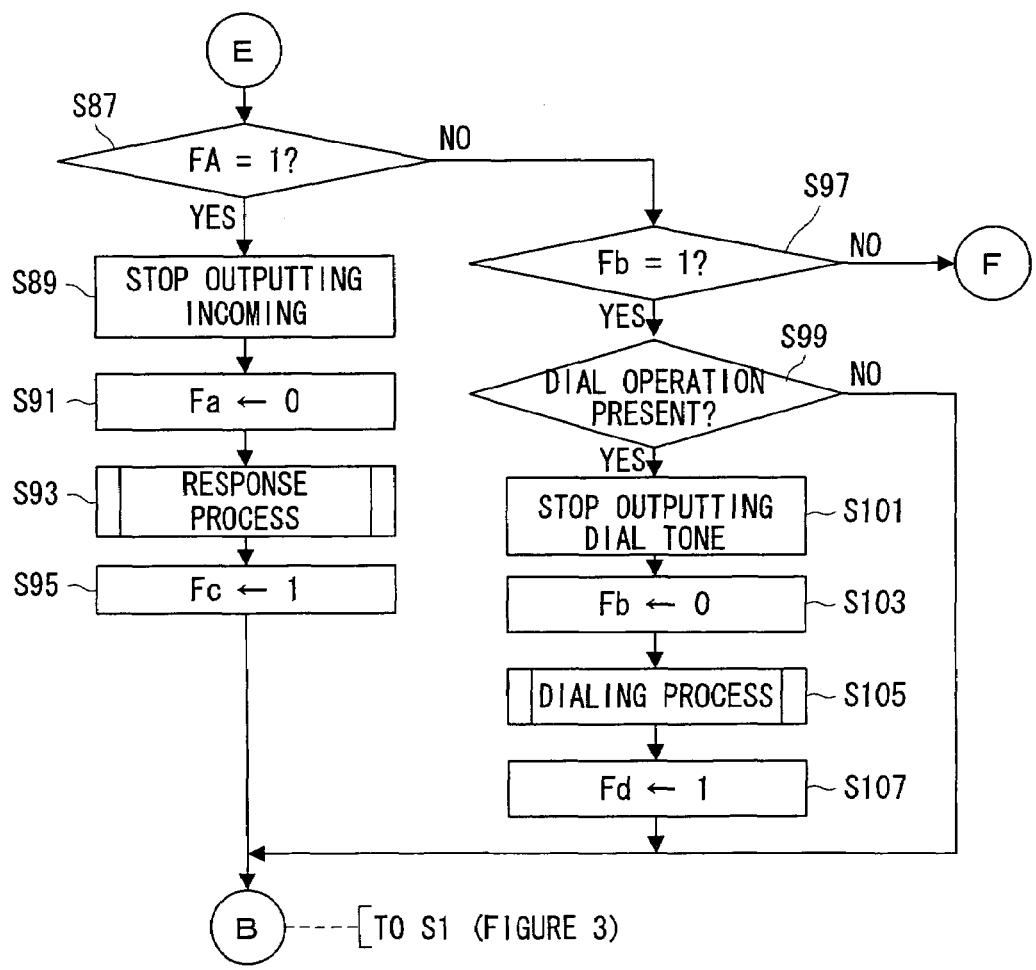
FIG. 6 is a flowchart continued from FIG. 4 through a different route from FIG. 5.

When the receiver 36 is in the off-hook state in the step S43 in FIG. 4, the main CPU 16 proceeds to a step S87 shown in FIG. 6. Then, in the step S87, it is determined whether or not "1" is set to the flag Fa.

When "1" is set to the flag Fa, that is, when the calling instruction from the opponent party is arrived, the main CPU 16 controls the pseudo-sound generating circuit 42 so as to stop outputting the incoming tone in a step S89. In a step S91, "0" is set to the flag Fa, and then, a response process is executed in a step S93. That is, a telephone packet signal including the above-described response instruction is generated, and the generated telephone packet signal is input to the LAN controller 14. In this case, since "1" is set to the above-described flag Fc, "0" is set to the flag Fc in a step S95, and the process goes through the flowchart.

On the other hand, in a case that the flag Fa is "0" in the step S87, the main CPU 16 proceeds to a step S97. Then, it is determined whether or not "1" is set to the flag Fb in the step S97. In a case that "1" is set to the flag Fb, that is, the operator intends to make a telephone call and lifts the receiver 36, the process proceeds to a step S99. In the step S99, it is determined whether or not a dialing operation is made by the operation key 46.

If the dialing operation is made in the step S99, the main CPU 16 proceeds to a step S101 to control the pseudo-sound generating circuit 42 so as to stop outputting the dial tone. In a step S103, "0" is set to the flag Fb, and then, a dialing process is executed in a step S105. That is, the above-described telephone packet signal including the calling instruction is generated, and the generated telephone packet signal is input to the LAN controller 14. In a step S107, "0" is set to the flag Fd, and the process goes through the flowchart. It is noted that in a case that the dialing operation is not made in the step S101, the process in the steps S101-S107 is skipped to go through the flowchart.

Figure 7:
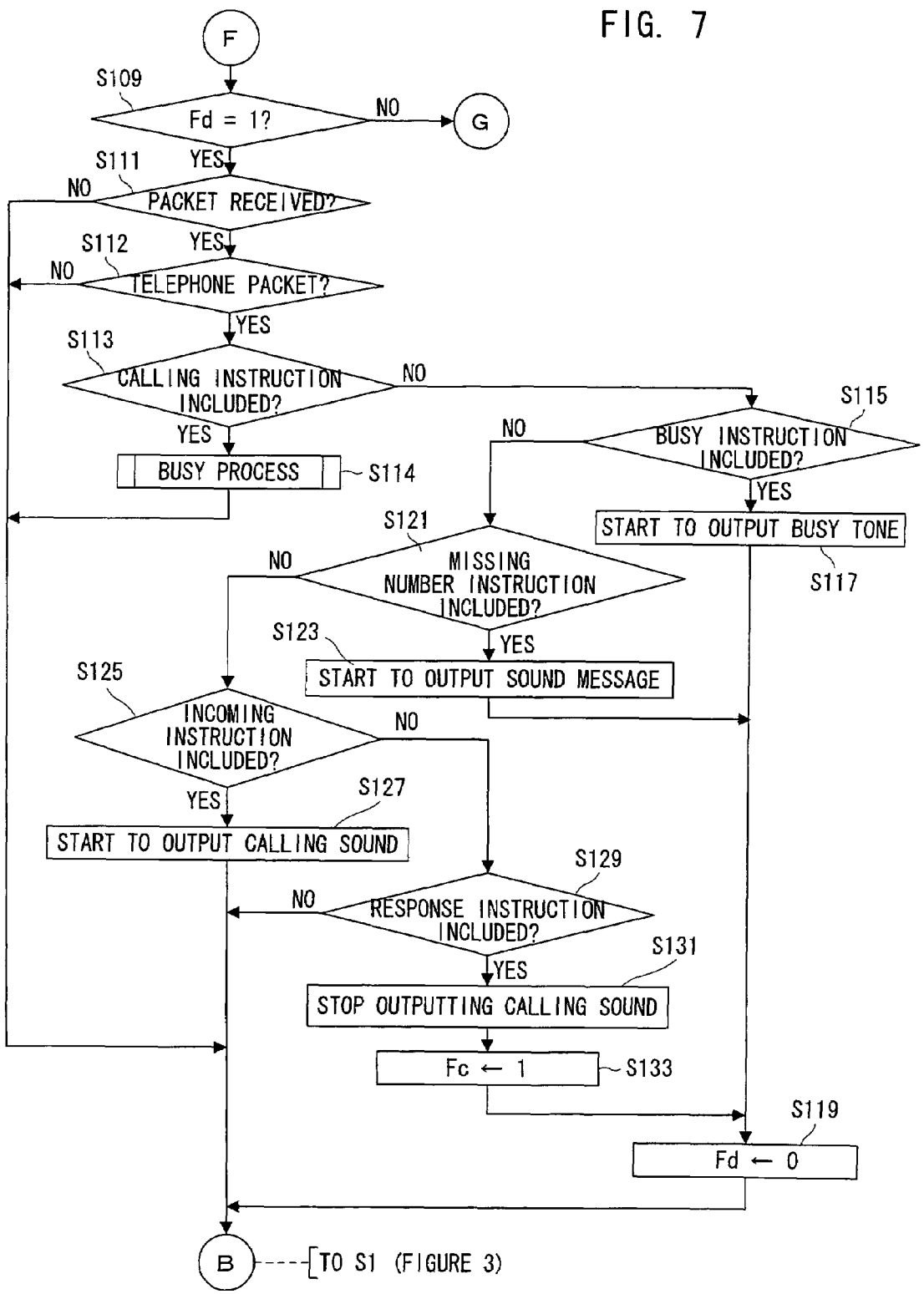
FIG. 7 is a flowchart continued from FIG. 6.

In a case the flag Fb is "0" in the step S97, the main CPU 16 proceeds to a step S109 in FIG. 7. Then, in the step S109, it is determined whether or not "1" is set to the flag Fd.

Here, in a case that "1" is set to the flag Fd, that is, in a case that the opponent party is under being called, the process proceeds to a step S111. Then, it is determined whether or not any packet signal is received. If the packet signal is not received, the process goes through the flowchart at one time. On the other hand, when any packet signal is received, the process proceeds to a step S112 to determine whether or not the received packet signal is the telephone packet signal.

When it is determined that the telephone packet signal is received, the main CPU 16 further determines whether or not the above-described calling instruction is included in the telephone packet signal in a step S113. Then, in a case that the calling instruction is included, a busy process similarly to that in the step S62 in FIG. 4 is performed in a step S114, and then, the process goes through the flowchart.

In a case that the calling instruction does not included in the step S113, it is determined whether or not a busy instruction is included in a step S115. In a case that the busy instruction is included, the pseudo-sound generating circuit 42 is controlled so as to output the busy tone 53 from the speaker 36*a* of the receiver 36 in a step S117, "0" is set to the flag Fd in a step S119, and then, the process goes through the flowchart. On the other hand, in a case that the received packet signal is not the telephone packet signal, the process directly goes through the flowchart.

In a case that the busy instruction is not included in the received telephone packet signal, the main CPU 16 proceeds from the step S115 to a step S121. It is determined whether or not the above-described missing number instruction is included in the telephone packet signal in the step S121. In a case that the missing number instruction is included, the main CPU 16 controls the pseudo-sound generating circuit 42 so as to output the above-described sound message from the speaker 36*a* of the receiver 36 in a step S123, then, the process proceeds to the step S119. In a case that the missing number instruction is not included, the process proceeds to a step S125.

In the step S125, the main CPU 16 determines whether or not the above-described incoming instruction is included in the received telephone packet signal. In a case that the incoming instruction is included, the pseudo-sound generating circuit 42 is controlled so as to output the above-described calling sound from the speaker 36*a* of the receiver 36 in a step S127, and then, the process goes through the flowchart. On the other hand, in a case that the incoming instruction is not included, the process proceeds to a step S129 to determine whether or not the above-described response instruction is included in the received telephone packet signal. Then, in a case that the response instruction is included, the pseudo-sound generating circuit 42 is controlled so as to stop outputting the calling sound in a step S131, "1" is set to the flag Fc in a step S133, and then, the process proceeds to the step S119. In a case that the response instruction is not included in the received telephone packet signal, the process goes through the flowchart as it is.

Figure 8:
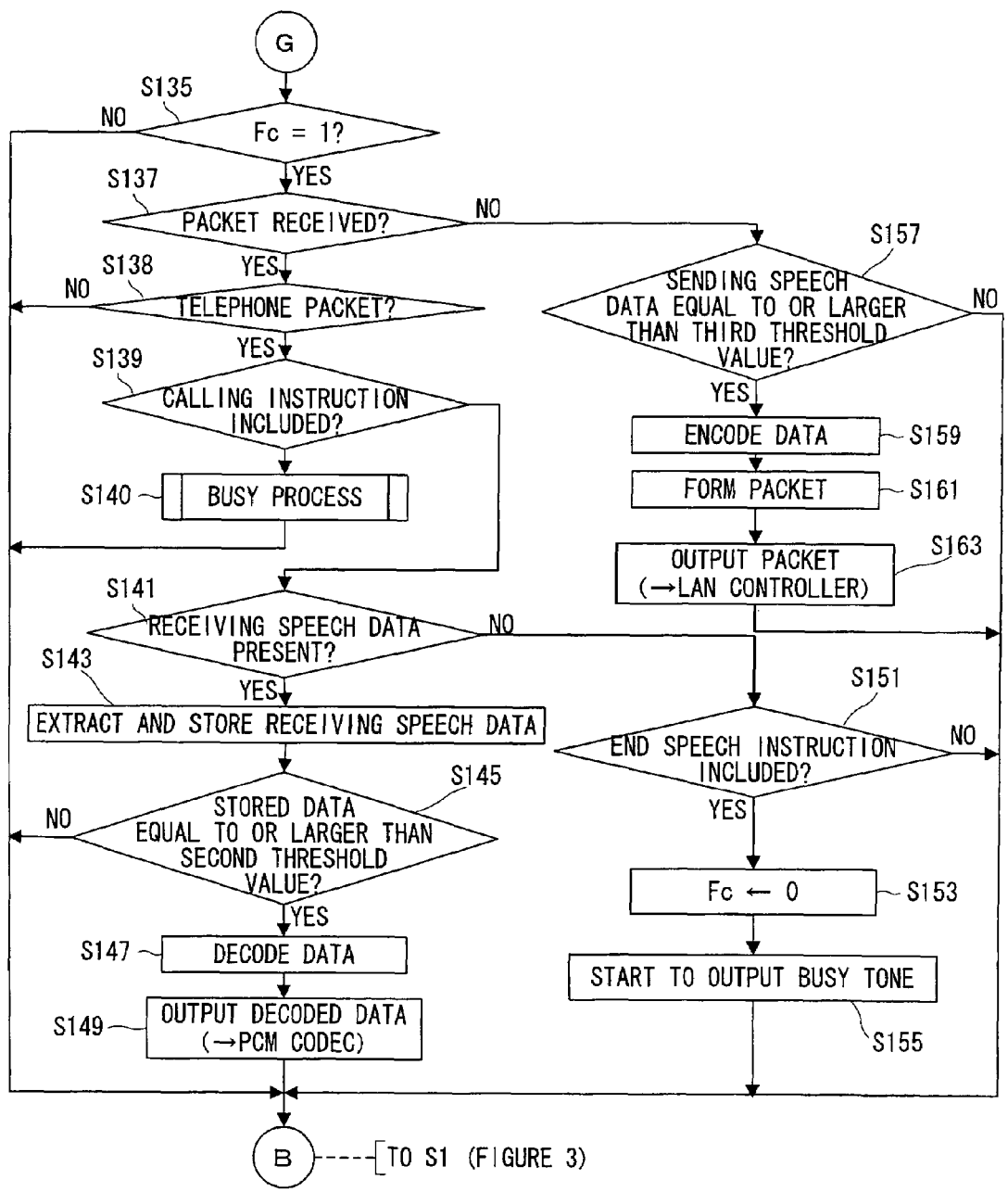
FIG. 8 is a flowchart continued from FIG. 7.

Furthermore, in a case that the flag Fd is not "1" in the above-described step S109, the main CPU 16 proceeds to a step S135 in FIG. 8. Then, in the step S135, it is determined whether or not "1" is set to the flag Fc.

In a case that "1" is set to the flag Fc, that is, in a case that communication is established with the opponent party, the main CPU 16 proceeds to a step S137 to determine whether or not any packet signal is received. In a case that the packet signal is received, the process proceeds to a step S138 to determine whether or not the received packet signal is the telephone packet signal.

When it is determined that the telephone packet signal is received, the main CPU 16 further determines whether or not a calling instruction is included in the telephone packet signal in a step S139. Then, in a case that the calling instruction is included, a busy process similarly to the process in the step S62 is performed in a step S140 in FIG. 4, and then, the process goes through the flowchart.

In a case that the calling instruction is not included in the step S140, it is determined whether or not the above-described receiving speech data is included in the telephone packet signal in a step S141. In a case that the receiving speech data is included, the receiving speech data is extracted from the telephone packet signal in a step S143, and the extracted receiving speech data is stored in the receiving speech data storing area 18*b* of the SDRAM 18. Then, the process proceeds to a step S145 to determine whether or not a data amount of the receiving speech data stored in the receiving speech data storing area 18b reaches a second threshold value.

When the data amount of the receiving speech data stored in the receiving speech data storing area 18b reaches the second threshold value, the main CPU 16 transfers the receiving speech data in the receiving speech data storing area 18b to the DSP 20 so as to be decoded in a step S147. Then, PCM data reproduced by the decoding is output to the PCM codec 32 in a step S149. Consequently, a receiving speech sound is output from the speaker 36a of the receiver 36.

It is noted that if it is determined "0" is set to the flag Fc in the step S135, the process directly goes through the flowchart to repeat from the step S1. Furthermore, in a case that it is determined that the received packet signal is not the telephone packet signal in the step S139, or in a case that it is determined that the data amount of the receiving speech data stored in the receiving speech data storing area 18b does not reach the second threshold value in the step S145, the process also directly goes through the flowchart.

Furthermore, in a case that it is determined that the receiving speech data is not included in the step S141, the main CPU 16 proceeds to a step S151. Then, it is determined whether or not the end speech instruction is included in the received telephone packet signal. In a case that the end speech instruction is included, "0" is set to the flag Fc in a step S153, the pseudo-sound generating circuit 42 is controlled so as to output a busy tone from the speaker 36a of the receiver 36 in a step S155, and then, the process goes through the flowchart. On the other hand, in a case that the end speech instruction is not included, the steps S153 and S155 are skipped to directly go through the flowchart.

In a case that any packet signal is not received in the above-described step S137, the process proceeds to a step S157. Then, in the step S157, it is determined whether or not the sending speech data equal to or more than a third threshold value is stored in the sending speech data storing area 18c of the SDRMA 18. If a storage amount of the sending speech data is equal to or more than the third threshold value, the sending speech data is transferred to the DSP 20 so as to be encoded in a step S159. Then, a packet signal is formed on the basis of the encoded sending speech data in a step S161, and the formed packet signal is output to the LAN controller 14 in a step S163. Thus, the packet signal including the sending speech data is transmitted to the opponent party. It is noted that if the storage amount of the sending speech data in the sending speech data storing area 18c is less than the third threshold value in the step S157, the process directly goers through this flowchart at a time to repeat from the step S1 again.

As understood from the above description, the contents reproducing apparatus 10 in this embodiment has the function as an Internet radio receiver and the function as an IP telephone, and therefore, this is useful for the user to desire to utilize the both functions. More specifically, when it functions as an IP telephone, the function as an Internet radio receiver automatically renders disabled, and therefore, when the operator utilizes the contents reproducing apparatus 10 as an IP telephone, it is possible to save trouble of operating it as the Internet radio receiver.

Further, since each of the broadcast data received when it functions as an Internet radio receiver and the receiving speech data received when it functions as an IP telephone are decoded by the common DSP 20, in comparison with separately providing decoders for decoding each of the data, it is possible to reduce a cost of the contents reproducing apparatus 10.

Then, during Internet radio, when there is a telephone call to activate the IP telephone function, a BGM taking the CD player 52 or the AM/FM tuner 54 as a sound source is output in place of the Internet radio. That is, the activation of the IP telephone function prevents the contents from being broken up, capable of melting unpleasantness of the listener. This is more effective in a fixed-type apparatus where a plurality of listeners can simultaneously listen to the contents.

Furthermore, a BGM is-played while the IP telephone function is activated, and therefore, the operator can make a communication with the opponent party, feeling relax. This is more effective because in the IP telephone fairly cheaper in calling rate than a telephone communication utilizing a general telephone line, a lengthy telephone call is projected.

It is noted that although a description is made on where the function as an IP telephone is added to the Internet radio receiver in this embodiment, the function as an IP telephone may be added to an apparatus except for the Internet radio receiver. For example, the function as an IP telephone is added to an apparatus receiving image information such as a TV program, and so on over the Internet.

Furthermore, connections to the Internet may be by wired or wireless manner. In addition, this invention is also applicable to an apparatus capable of delivering the contents and making a communication over a network except for the Internet.

Then, although the sub CPU 48 is provided in addition to the main CPU 16, a processing (man-machine interface processing) by the sub CPU 48 may also be executed by the main CPU 16 without providing the sub CPU 48. Furthermore, the main CPU 16 and the DSP 20 are integrally constructed by the ASIC with each other, or these may be separately provided.

Also, although the player 52 and the AM/FM tuner 54 are provided as a BGM sound source, another apparatus such as cassette tape recorder, and so on may be provided as the BGM sound source. The input of the sound source switching circuit 24 is provided with an external sound input terminal, and to the external sound input terminal, the BGM sound source may be connected. Furthermore, broadcasting contents downloaded into the above-described flash memory 58 may be taken as a sound source.

In addition, a so-called music server (registered trademarks) taking a hard disk recording a plurality of musics in advance as a sound source may be provided. In this case, when the IP telephone function is activated, if a music the same in genre as the receiving channel of the Internet radio broadcasting is reproduced, it is possible to further ease unpleasantness of the audience.

Then, the receiver 36 may be connected to the main body of the contents reproducing apparatus 10 in a wireless manner, and a so-called child device may be provided in addition to the receiver. Furthermore, a key dedicated to the dialing operation may be provided in addition to the operation key 46.

Also, a tone control circuit (equalizer) for controlling frequency characteristics of a sound signal input to the speakers 28 and 30, that is, sound quality of a output sound of the speakers 28 and 30 may be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A contents reproducing apparatus with telephone function, comprising:
a reproducer for selectively reproducing a telephone voice signal and a first content signal, a generator for generating a second content signal, a disabler for disabling said generator when a reproducing signal by said reproducer is said first content signal, and an activator for activating said generator when a reproducing signal by said reproducer is said telephone voice signal, whereupon a termination of said telephone voice signal said first content signal is automatically reproduced by said reproducer, wherein said reproducer includes a DSP for decoding said telephone voice signal and content signals.

2. A contents reproducing apparatus with telephone function according to claim 1, further comprising:

a first outputter for outputting said telephone voice signal, and a second outputter for outputting any one of said first content signal and said second content signal.

3. A contents reproducing apparatus with telephone function, comprising:

a reproducer for selectively reproducing a telephone voice signal and a first content signal, a generator for generating a second content signal, a disabler for disabling said generator when a reproducing signal by said reproducer is said first content signal, and an activator for activating said generator when a reproducing signal by said reproducer is said telephone voice signal, a first outputter for outputting said telephone voice signal after reproducing by said reproducer, and a second outputter for outputting said first content signal after reproducing by said reproducer at a time that said telephone voice signal is not output by said first outputter, and said second content signal generated by said generator at a time that said telephone voice signal is output by said first outputter.

4. A contents reproducing apparatus with telephone function according to claim 2 or claim 3, wherein said second content signal belongs to the same genre as said first content signal.

5. A contents reproducing apparatus with telephone function according to claim 2 or claim 3 being a fixed-type apparatus.

6. A contents reproducing apparatus with telephone function according to claim 2 or claim 3, further comprising a receiver for receiving said telephone voice signal and said first content signal via a common communication line.

7. A contents reproducing apparatus with telephone function according to claim 1 or claim 3, further comprising a receiver for receiving said telephone voice signal and said first content signal via a common communication line.

8. A contents reproducing apparatus with telephone function according to claim 1 or claim 3, wherein said second content signal belongs to the same genre as said first content signal.

9. A contents reproducing apparatus with telephone function according to claim 1 or claim 3 being a fixed-type apparatus.

* * * * *